INVENTOR
MORDEN G. BROWN
ATTORNEYS

Jan. 12, 1965 M. G. BROWN 3,164,918
DISPLAY APPARATUS
Filed March 30, 1961 2 Sheets-Sheet 2

INVENTOR
MORDEN G. BROWN
BY
ATTORNEYS

United States Patent Office 3,164,918
Patented Jan. 12, 1965

3,164,918
DISPLAY APPARATUS
Morden G. Brown, Woodstock, Conn., assignor to American Optical Company, Southbridge, Mass., a voluntary association of Massachusetts
Filed Mar. 30, 1961, Ser. No. 99,491
3 Claims. (Cl. 40—130)

The field of this invention is that of display apparatus, and the invention relates, more particularly, to apparatus such as taximeter registers, gasoline pump meter registers and the like which have movable dials adapted for display purposes and which incorporate means for illuminating said dials.

Many different types of apparatus such as taximeters and the like which are adapted to measure the value of a service rendered or the amount of a product dispensed include movable dials marked with numbers or other characters which are adapted to display said value or amount to be viewed, for example, by a person purchasing said product or service. Frequently, as in the case of taximeters, the dials of such display apparatus must be viewed in darkness or from a distance or under other conditions adverse to good visibility so that illumination of the dials is desirable. However, because various shafts and gears and the like forming part of the complex metering mechanisms with which such meter dials are associated generally extend into the interior of the dials, back-illumination of such dials has heretofore been difficult or impossible to achieve. Thus it has been conventional practice to provide only front illumination for such meter dials even though this has resulted in glare from surfaces of the dials or has reduced contrast between dial markings and background areas of the dials or has otherwise provided inadequate illumination.

It is an object of this invention to provide novel and improved display apparatus; to provide display apparatus incorporating one or more display dials having means for back-illuminating numbers or other characters marked on the dial peripheries; to provide display apparatus incorporating one or more rotatable dials which are marked with a plurality of numbers or other symbolic characters and which are adapted to be rotated for selectively disposing individual characters in a display position, said apparatus including means for back-illuminating the dial characters which are disposed in display position by means of a light source located exteriorly of the dials; and to provide such display apparatus which is of simple, economical and compact construction.

It is a further object of this invention to provide display apparatus comprising one or more rotatable dials each having a plurality of pairs of light-transmitting peripheral dial portions, each of said dials being adapted to be rotated for selectively disposing one light-transmitting dial portion of each of said pairs in a display position while the other light-transmitting dial portion of said pair is disposed in a light-receiving position, a light source adapted to direct light upon dial portions selectively disposed in said light-receiving position, and groups of light-conducting fibers within each dial extending between the light-transmitting dial portions of respective pairs, said fibers in each group being arranged at corresponding ends to form a face having the configuration of a selected number or other symbolic character so that each group of light-conducting fibers within each dial is selectively adapted to receive light at one end from said source and to project said light from the opposite ends thereof through a light-transmitting dial portion disposed at said display position, thereby to establish the symbolic character defined by said opposite ends of the group of fibers in back-illuminated, luminous-appearing form at said display position to be viewed from outside the dial.

Other objects, advantages and details of the display apparatus provided by this invention will appear in the following detailed description of preferred embodiments of the invention, the description referring to the drawings in which.

Figure 1:
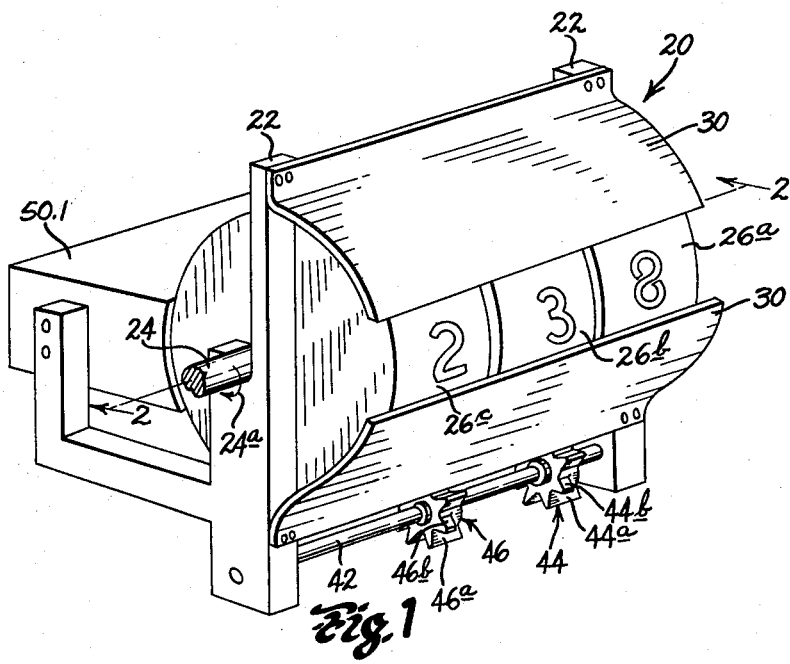
FIG. 1 is a perspective view of a display mechanism provided by this invention.
Figure 2:
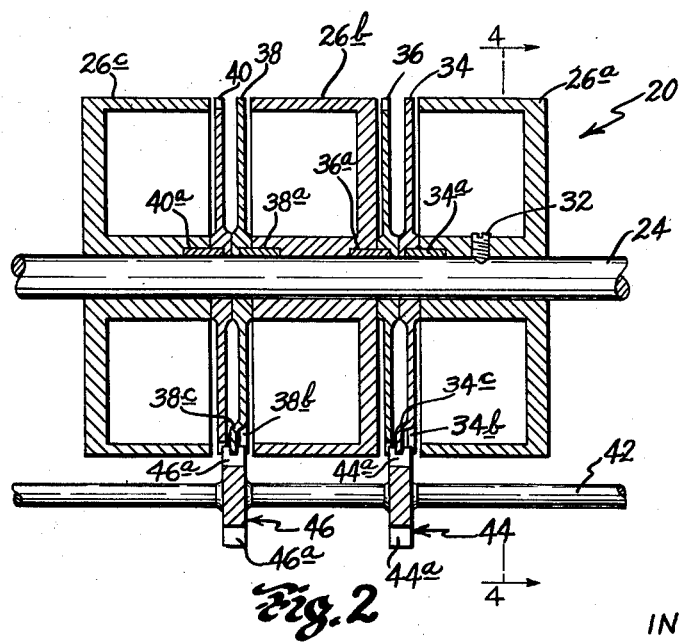
FIG. 2 is a partially complete section view along line 2—2 of FIG. 1 with the ribbons omitted for purposes of clarity.

Referring to the drawings, 20 in FIGS. 1 and 2 indicates a display mechanism such as might be incorporated in a conventional taximeter apparatus or the like for displaying a quantity or value measured by the apparatus. Where the display mechanism is adapted to be incorporated in a taximeter as illustrated, the mechanism can include a pair of frame members 22 for supporting a rotatable shaft 24 which can, in turn, support three rotatable meter dials 26a, 26b and 26c. The meter dials can have symbolic characters such as the numbers 0–9 defined in sequence at spaced intervals around the dial peripheries, and the frame members 22 can support shield members 30 by means of which all but a single character of each dial is masked from view at a given time. As will be understood, the shaft 24 can be rotatably driven by a conventional taximeter apparatus (not shown) so that rotation of the shaft in the direction indicated by the arrow 24a is proportional to the mileage traveled by a taxi in well known manner. The meter dials 26a, 26b and 26c can then be rotatably driven by the shaft 24 so that the dial characters selectively moved to a display position between the shield members 30 at any given time in response to shaft rotation can indicate the value of the taxi service thus far rendered.

For example, where the value of the taxi service rendered during each revolution of the shaft 24 is ten cents, the dial 26a can be secured to the shaft by a set screw 32 or other suitable means for rotating in conjunction with the shaft, and the dial can be keyed to a disc member 34 as shown at 34a in FIG. 2 so that the disc member is also adapted to rotate with the shaft. The dial 26b can then be mounted for free rotation on the shaft 24 and can be keyed to a gear member 36 as at 36a and to a second disc member 38 as at 38a so that the dial 26b, the gear 36, and the disc member 38 are adapted to rotate together. Similarly, the dial 26c can be mounted for free rotation on the shaft and can be keyed to the gear 40 as at 40a. The frame members 22 can support a fixed shaft 42 upon which Geneva wheels 44 and 46 are mounted for free rotation. In this arrangement, wide teeth 44a in the Geneva wheel 44 normally engage the periphery of the disc member 34 for preventing movement of the Geneva wheel, and a narrow tooth 44b of the Geneva wheel is meshed with the gear 36 holding the gear 36 and the dial 26b in fixed position. As the disc member 34 is rotated with the dial 26a, a notch 34b in the disc member will align with teeth 44a of the Geneva wheel to permit movement of the wheel as a projecting piece 34c of the disc engages a wheel tooth 44b. The projecting piece 34c can be adapted to rotate the Geneva wheel 44 for driving the gear 36 to effect 1/10 of a revolution of the dial 26b each time that the disc notch 34b becomes aligned with a Geneva wheel tooth 44a in conventional manner. Similarly, engagement of the disc member 38 with wide teeth 46a of the Geneva wheel 46 normally prevent movement of the wheel 46 and of the meter dial 26c but, as a disc notch 38b aligns with the wheel 46 upon each full revolution of the dial 26b, a projecting piece 38c of the disc member will rotate the wheel 46 to effect 1/10 of a revolution of the gear 40 and the dial 26c. In this manner, the numerical value indicated by the meter dial characters displayed to view between the shield members 30 can be increased by ten for each revolution of the shaft as will be understood. It should be noted that although a taximeter display mechanism has been described for the purposes of illustration, this invention relates to any display apparatus having symbolic characters arranged for display purposes and relates particularly to display mechanisms having rotatable, substantially cylindrical, display dials.

Figure 3:
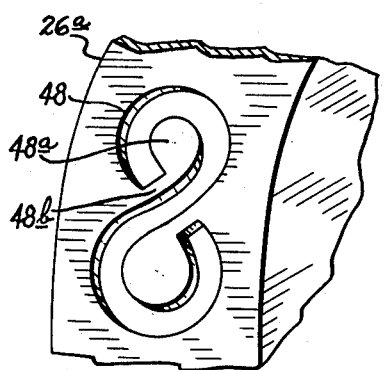
FIG. 3 is an enlarged, partial, perspective view of a display dial incorporated in the mechanism of FIG. 1.

In order to provide meter dials upon which dial characters can be read under conditions adverse to good visibility according to this invention, means are provided for back-illuminating the characters. That is, means are provided for projecting light from within each dial member at the peripheral dial portion selectively displayed to view between the shield member 30, whereby the dial character defined at said display position on each dial will appear luminous and in sharp contrast to other portions of the dial periphery and can be easily read from outside the dial member. For this purpose, the peripheral dial portion allotted to each character can be apertured or otherwise adapted to transmit light therethrough, each dial aperture 48 preferably having the configuration of the respective character to be displayed at that portion of the dial as shown in FIG. 3. Where a character to be defined by a dial aperture of matching configuration would require encirclement of a portion 48a of the dial by the aperture, as would be the case in forming apertures in the configuration of the numbers 6, 8, 9, 0 and possibly 4, the dial aperture 48 can be modified slightly to form a stencil-like aperture and to provide support as at 48b for the encircled dial portion 48a as shown in FIG. 3.

Figure 4:
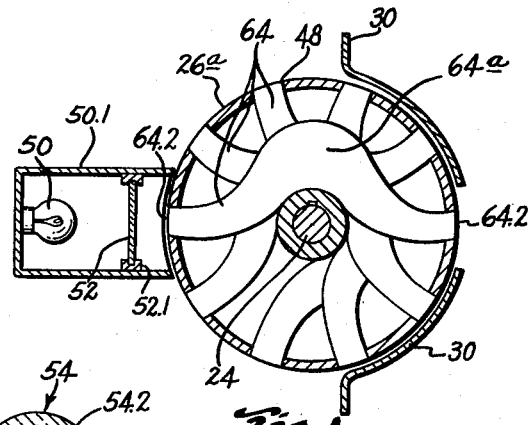
FIG. 4 is a section view along line 4—4 of FIG. 2.

A light source such as the lamp 50 is then provided and is adapted as shown in FIG. 4 to furnish light to be projected from within the dials through the dial apertures 48 which are selectively disposed in display position. Since the meter dials 26a, 26b and 26c may be of relatively small diameter and will generally have the shaft 24 or other similar means extending therethrough, it will generally be desirable to mount the lamp 50 exteriorly of the meter dials as shown in FIGS. 1 and 4. In this regard, it should be noted that the illustrated display mechanism 20 is of a relatively simple construction but that many other display mechanisms of the type herein contemplated are relatively more complex so that gears and the like and other mechanical structure associated with the display-mechanism driving apparatus frequently extend into the interior of the meter dials. In such complex display mechanisms, it will frequently be impossible to mount a light source directly within the display dials of the mechanism. The lamp 50 is preferably mounted within an enclosure 50.1 which can be supported by the frame members 22 or in any other similar manner and is adapted to direct light upon a selected portion of the display dial peripheries, the lamp being positioned so that light from the lamp is received within one dial aperture of a pair of dial apertures each time that the other dial aperture of said pair is disposed at a display position between the shield members 30. For this purpose, the peripheries of the dials 26a, 26b and 26c could be provided with an additional aperture to be paired with each of the dial apertures 48 which have the configuration of number characters as previously described. However, where the meter dials have apertures 48 defining number characters 0–9 in equally spaced relation thereon as described, a dial aperture 48 having the configuration of the number 1 will occupy a position on the dial periphery diametrically opposite a dial aperture 48 having the configuration of the number 6. Similarly pairs of dial apertures having the configuration of numbers 2 and 7, 3 and 8, 4 and 9, and 5 and 0 will also be disposed in respective diametric opposition. Therefore, the lamp 50 is preferably arranged to direct light upon the peripheries of the dials 26a, 26b and 26c at a position diametrically opposite to the dial display position formed between the shield members 30, whereby said light will be received within one aperture 48 of the above-described pairs of diametrically opposed apertures when the other aperture 48 of the pair is located in display position between the shield members. As will be understood, a separate light source may be provided for directing light upon the periphery of each dial or a single light source can be adapted to direct light upon a plurality of dials. Preferably a light-diffusing means such as the ground glass member 52 is positioned within the enclosure 50.1 by a support 52.1 or the like so that light from the source 50 will be adapted to impinge upon the meter dial peripheries at diverse, relatively steep angles of incidence for a purpose to be hereinafter explained.

Figure 5:
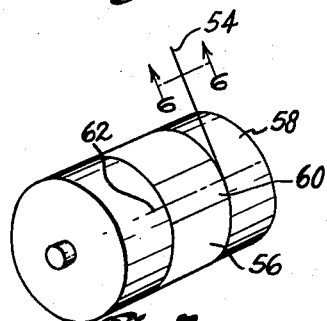
FIG. 5 is a diagrammatic perspective view illustrating a step in forming light-conducting means to be incorporated in the mechanism of FIG. 1.
Figure 6:
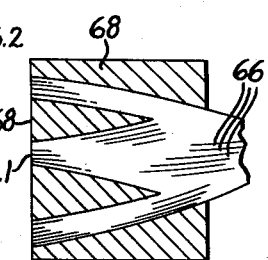
FIG. 6 is a section view along line 6—6 of FIG. 5.
Figure 7:
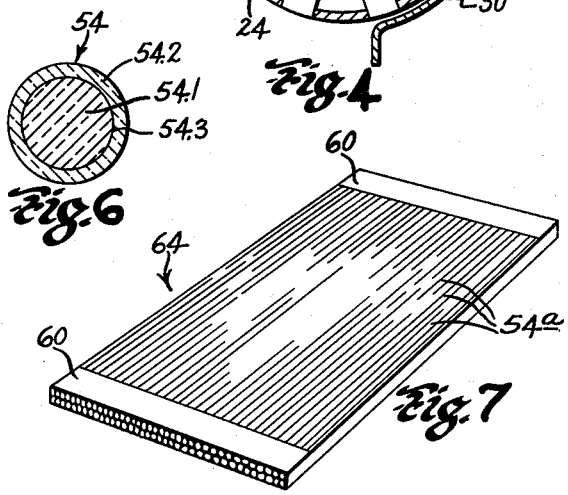
FIG. 7 is a perspective view illustrating a subsequent step in forming said light-conducting means.
Figure 8:
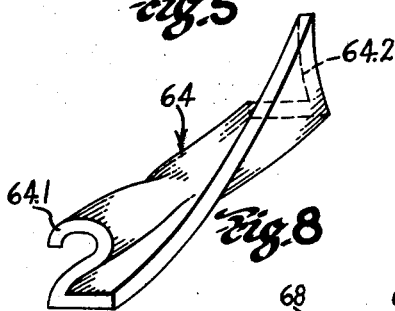
FIG. 8 is a perspective view illustrating a further subsequent step in forming said light-conducting means.

According to this invention, light-conducting means are arranged within the meter dials 26a, 26b and 26c in such a manner as to receive light at one end through a dial aperture 48 from the light source 50 located exteriorly of the dial member and to project said light from within the dial members through a dial aperture 48 or other light-transmitting dial portion selectively disposed at a display position between the shield members 30. For example, a light-conducting fiber 54 can be provided, the fiber preferably having a light-transmitting core 54.1 of flint glass or the like of relatively high index of refraction and a light-insulating cladding 54.2 of crown glass or the like of relatively low index of refraction such that the fiber is adapted to conduct light from end to end thereof by total internal reflection of the light from the interface 54.3 between the fiber core and cladding in accordance with well known principles. See FIGS. 5–8. Alternatively, the light-conducting fiber 54 could comprise an unclad fiber having a smooth peripheral surface, a fiber of this type being adapted to conduct light from end to end thereof by total internal reflection from the interface between the peripheral fiber surface and the medium surrounding the fiber. Such unclad fibers will, of course, be substantially less efficient as light-conductors and will tend to leak light through the peripheral surfaces thereof. Preferably, but not necessarily, the fiber 54 has a round cross-sectional shape, has a diameter on the order of 0.010 inch or less, and has considerable flexibility so that lengths of the fiber can be easily conformed to selected radii. The fiber 54 can then be wound in the form of a helix 56 on a cylindrical mandrel 58; the helix can be coated along a relatively narrow strip 60 with an epoxy resin or other suitable adhesive for securing adjacent convolutions of the helix together; and the helix can be cut along a line 62 through said secured strip of the helix as shown in FIG. 5 to form a flat fiber ribbon 64 as shown in FIG. 7 wherein lengths 54a of the light-conducting fiber are arranged in side-by-side relation and are secured together at their ends by the adhesive 60. The ends of the fiber lengths 54a can then be arranged as shown in FIG. 8 to form a face 64.1 at one end having the configuration of a selected symbolic character such as that of the number 2 and to form a face 64.2 at the opposite end having the configuration of another symbolic character such as that of the number 7, the characters defined by the faces 64.1 and 64.2 being in inverted relation to each other.

If desired, the fiber ribbon 64 can be annealed or otherwise treated for maintaining the ends of the fiber ribbon in the described configurations, but, preferably, the fiber ribbon is fitted within a meter dial such as the dial 26a and is adapted to extend between a pair of dial apertures 48 having corresponding configurations of the numbers 2 and 7. As will be understood, the face 64.1 of the fiber ribbon can be fitted within the dial aperture having the configuration of the number 2 and can be secured therein with a suitable adhesive whereas the face 64.2 of the ribbon can be fitted and secured within a dial aperture having the configuration of the number 7. Corresponding fiber ribbons can then be arranged between other pairs of the dial apertures within each of the meter dials 26a, 26b and 26c as indicated particularly in FIG. 4, whereby each dial aperture will be connected by light-conducting means to another dial aperture located on the dial in a position diametrically opposite thereto. Since the fiber lengths 54a embodied in the ribbons 64 are flexible and are not secured together except at the ends of the fiber ribbon, the fiber lengths in the ribbons can be adapted to extend around the shaft 24 supporting the dials or around any other similar structure which may extend within the interior of the meter dials in the manner illustrated in FIG. 4. Further, where a plurality of fiber ribbons 64 are arranged within a meter dial so that the ribbons intersect or cross over each other as shown in FIG. 4, the fiber lengths embodied in the ribbons can be spread out at said point of intersection as illustrated at 64a so that the ribbons do not build up to an excessive height at said point of intersection. If desired, the fiber lengths 54a in the ribbon 64 can be attenuated intermediate the ribbon faces 64.1 and 64.2 in any conventional manner for reducing the volume or bulk of the fibers which must be enclosed within the meter dials. Once the fiber ribbons have been fitted within the various meter dials in the manner described, the fiber lengths 54a embodied therein can be potted in their existing disposition with a suitable plastic or adhesive, if desired, for protecting the fiber lengths. Where the fiber ribbons 64 embody lengths of unclad light-conducting fibers as previously suggested, the side surfaces of the ribbon which are exposed to view after the end faces of the ribbon have been conformed to the desired configuration are preferably coated with an opaque material such as black paint for preventing leakage of light from sides of the fiber ribbon.

In the described mechanism 20, the shaft 24 is adapted to rotate the meter dials 26a, 26b and 26c so that number characters defined on the meter dial peripheries by the dial apertures and by the end faces of the fiber ribbons 64 are selectively displayed to view between the shield members 30 for indicating the value of taxi service or the like measured by conventional means (not shown) which rotate the shaft. Each pair of number characters defined on the periphery of a meter dial in diametrically opposite locations will be formed by respective opposite end faces of a group or ribbon 64 of light-conducting fiber lengths 54a so that, as one number character defined by a group of fiber lengths is moved to view between the shield members by rotation of the shaft 24, the other number character defined by said group of fiber lengths will be moved into a position to receive light from the lamp 50. For example, when the number 7 defined on a meter dial by an end face of a fiber ribbon 64 is displayed to view, light from the lamp 50 will fall upon the number 2 defined on the dial periphery by the opposite end face of said ribbon. Said light will be received within the fiber lengths forming the face having the configuration of the number 2, will be conducted through the fiber lengths, and will be projected from the opposite ends of the fiber lengths which form the face having the configuration of the number character 7. Thus the number 7 will be back-illuminated and will have a luminous appearance which can be in sharp contrast to the peripheral surface of the dial. Preferably, the surfaces of such meter dials are painted a dark color for heightening the contrast between the illuminated numbers and the surfaces of the dials. Since light from the source 50 incident upon the fiber ends defining the number 2 will be received within the fiber lengths at various angles as a result of diffusion of the light by the ground glass member 52, the light projected from the opposite ends of the fiber lengths defining the number 7 will also be projected at various angles so that the luminous-appearing number 7 can be readily seen from various angles of view.

Figures 9, 10:
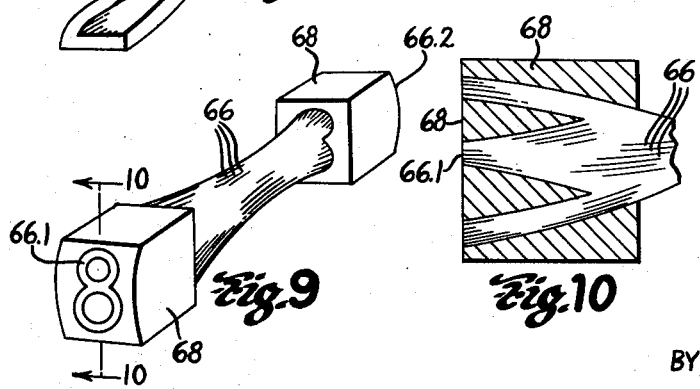
FIG. 9 is a perspective view similar to FIG. 8 illustrating an alternative embodiment of the light-conducting means utilized in the invention.
FIG. 10 is a partial section view along line 10—10 of FIG. 9.
Figure 11:
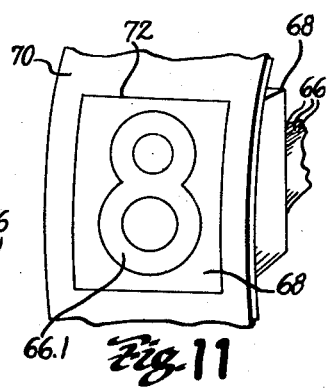
FIG. 11 is a partial perspective view similar to FIG. 3 illustrating an alternative embodiment of a display dial to be incorporated in the mechanism of this invention.

Although the fiber lengths 54a have been described as arranged in a ribbon 64 for ease in forming the ends of the ribbon into the configuration of number characters, and although the peripheries of the meter dials 26a, 26b and 26c have been provided with light-transmitting dial apertures 48 having the configuration of number characters for receiving said ribbon ends therein, any groups of light-conducting fibers can be arranged at opposite ends to form faces having the configuration of selected symbolic characters and such groups of fibers can be mounted in a display dial or the like in any similar manner within the scope of this invention. For example, as shown in FIGS. 9–11, a group of individual light-conducting fibers 66 similar to the fiber 54 previously described can be assembled in side-by-side, generally parallel, relation and corresponding ends of the fibers can be arranged to form faces 66.1 and 66.2 having the configuration of different symbolic characters such as the numbers 8 and 3 respectively. There need be no specific relationship between the position of a fiber in the face 66.1 and the position of that same fiber in the face 66.2. Forming of the fiber ends in the desired configurations can be easily accomplished in any well known manner according to the invention. For example, the ends of a bundle of fibers 66 can be fitted within a mold (not shown) of the desired shape and the fibers can be secured together therein by a suitable adhesive or by fusing the fiber claddings together in well known manner. The ends of the molded group of fibers can then be embedded in a preferably opaque material 68 such as a colored plastic, resin or the like for providing the ends of the group of fibers with a more or less regular geometrical shape as shown in FIG. 9. Groups of fibers can be prepared in this manner to provide an end face defined by fibers for each of the number characters 0–9.

A dial member 70 which is generally similar to a dial member 26a as previously described can then be provided with ten equally spaced peripheral apertures 72, one of which is illustrated in FIG. 11. Groups of molded fibers can then be fitted within the dial member extending between respective pairs of diametrically opposite dial apertures 72, the dial apertures being each adapted to receive and hold an end of such a group of fibers which has been embedded in the opaque material 68. Such a dial member can then be mounted in a mechanism such as the display mechanism 20 as previously described for the same purpose as the dial members 26a, 26b and 26c as will be understood.

It should be understood that although particular embodiments of this invention have been described for the purposes of illustration, this invention includes all modifications and equivalents thereof which fall within the scope of the appended claims.

Having described my invention, I claim:

1. A display device comprising a light source, a hollow dial member mounted for rotation about a selected axis adjacent said source, said dial member having at least one pair of light-transmitting dial-member portions which are arranged so that one of said portions is selectively disposed to receive light from said source located outside the dial member when the other of said light-transmitting portions is selectively disposed at a single display position by rotation of the dial member, and a plurality of light-conducting fibers each having a light-transmitting core and a light-insulating cladding, said fibers being secured within said dial member for rotation with said dial member, said fibers extending between said light-transmitting dial member portions for receiving light at one end from said source and for projecting said light from the opposite ends thereof from within the dial member through the light-transmitting dial member portion selectively disposed at said display position, said fibers being arranged in cooperative relation at said opposite ends to define a face having the configuration of a symbolic character, thereby to selectively display said character in back-illuminated form to be viewed from outside the dial member.

2. A display device comprising a light source, a hollow, substantially cylindrical dial member mounted for rotation about its cylindrical axis adjacent said source, said dial member having a plurality of pairs of light-transmitting peripheral portions which are arranged so that each light-transmitting dial member portion is adapted to be selectively disposed at a single display position by rotation of the dial member and so that one light-transmitting portion of each pair is adapted to receive light from said source located outside said dial member when the other light-transmitting portion of said pair is disposed at said display position, and a plurality of light-conducting fibers each having a light-transmitting core and a light-insulating cladding, said fibers being secured within said dial member in groups extending between light-transmitting dial member portions of respective pairs for receiving light at one end from said source and for projecting said light from the opposite ends thereof from within the dial member only through the light-transmitting member portion selectively disposed at said display position, each group of fibers being arranged in cooperative relation at corresponding ends to define faces having the configuration of respective different symbolic characters, thereby to selectively display said characters in back-illuminated form at said display position to be viewed from outside the member.

3. A display device comprising a hollow, substantially cylindrical dial member, shaft means extending along the cylindrical axis of the dial member to support the dial member for rotation about said axis, a light source located exteriorly of the dial member adapted to direct light upon one side of the dial member periphery, said dial member having a plurality of pairs of diametrically-opposed, peripheral apertures which are arranged so that each aperture is adapted to be selectively disposed at a single display position by rotation of the dial member and so that one aperture of each pair is adapted to receive light from said source when the other aperture of said pair is disposed at said display position, each of said dial member apertures having a stencil-like configuration representing a respective symbolic character, and a plurality of fiber ribbons each embodying a plurality of flexible light-conducting fibers arranged in side-by-side relation, each of said fibers having a light-transmitting core and a light-insulating cladding, said fiber ribbons extending around said shaft means between dial member apertures of respective pairs and having their opposite ends secured within said apertures for forming ribbon end faces having the configuration of respective symbolic characters, thereby to receive light from said source to selectively display said symbolic characters in back-illuminated form at said display position to be viewed from outside the dial member.

References Cited in the file of this patent
UNITED STATES PATENTS

| | | |
|---|---|---|
| 1,859,813 | Wilhelm | May 24, 1932 |
| 2,301,185 | Arnold | Nov. 10, 1942 |
| 2,354,367 | Ford | July 25, 1944 |
| 2,448,244 | Arnold | Aug. 31, 1948 |
| 2,507,909 | Kaysen | May 16, 1950 |
| 2,639,528 | Ochsner | May 26, 1953 |
| 2,728,155 | Hunter | Dec. 27, 1955 |
| 2,909,857 | Wilson | Oct. 27, 1959 |
| 2,939,362 | Cole | June 7, 1960 |
| 2,992,587 | Hicks | July 18, 1961 |
| 3,040,458 | Mathews | June 26, 1962 |
| 3,104,324 | Rabinow | Sept. 17, 1963 |